United States Patent [19]

Boyd

[11] Patent Number: 5,301,450
[45] Date of Patent: Apr. 12, 1994

[54] FISH NET WITH ESCAPE PANEL

[76] Inventor: David M. Boyd, 3978 Aeries Way, Virginia Beach, Va. 23455

[21] Appl. No.: 5,082

[22] Filed: Jan. 15, 1993

[51] Int. Cl.$^5$ ............................................. A01K 73/02
[52] U.S. Cl. ........................................ 43/9.2; 43/9.1; 43/104
[58] Field of Search ................ 43/9.2, 9.95, 9.1, 14, 43/101, 104; 119/3

[56] References Cited

U.S. PATENT DOCUMENTS

| | | | |
|---|---|---|---|
| 4,982,697 | 1/1991 | Neff | 119/3 |
| 5,007,377 | 4/1991 | Muench, Jr. | 119/4 |

FOREIGN PATENT DOCUMENTS

| | | | |
|---|---|---|---|
| 2-53911 | 2/1990 | Japan | 43/9.95 |
| 1606075 | 11/1990 | U.S.S.R. | 43/9.95 |
| 4044 | of 1895 | United Kingdom | 43/9.2 |
| 8803 | of 1914 | United Kingdom | 43/9.2 |

Primary Examiner—Paula A. Bradley
Assistant Examiner—Jeanne M. Elpel
Attorney, Agent, or Firm—Sughrue, Mion, Zinn, Macpeak & Seas

[57] ABSTRACT

A fish net constructed of conventional open mesh flexible net material is provided with an aperture having an escape panel secured therein. The escape panel is comprised of extruded plastic net material which is substantially rigid to maintain the mesh configuration while permitting slight bending of the panel. Thus, undersized fish can escape through the mesh of the escape panel without being gilled.

1 Claim, 2 Drawing Sheets

FISH NET WITH ESCAPE PANEL

BACKGROUND OF THE INVENTION

The present invention is directed to a flexible fish net having an escape panel wherein the escape panel is provided with a substantially rigid mesh having a mesh size greater than the mesh size of the flexible fish net.

In various types of fishing involving the use of nets, the largest problem involves the netting of a plurality of different types of marine life in addition to the desired species. Even if the catch consists substantially of the desired species of fish, there is still the problem of sorting undersized fish and returning them to the ocean for continued growth. In most instances the sorting of the undersized fish from the desired fish takes place after the catch has been completely removed from the water. Depending upon the efficiency of the sorting operation, the time lapse could prove fatal to a large number of small fish. Furthermore, the sorting of the undersized fish from the desired fish involves a considerable amount of time and effort which the fishing industry would like to eliminate. Therefore, it would be clearly desirable to cull the undersized fish of various species from the net as it fishes.

In the past, netting having a larger mesh has been used experimentally in a pound head in an attempt to achieve this result. However, due to the flexibility of the netting, the size of the individual mesh openings varied considerably resulting in too many fish being gilled to make this a feasible solution to the problem.

While various sorting devices and escape hatches have been devised for various species of marine life, such devices are not directed to sorting undersized fish from the fish of desirable size and permitting the undersized fish to escape during the netting operation.

The patent to Savoie (U.S. Pat. No. 4,043,068) is directed to an escape hatch for a fish net wherein a substantially rectangular panel is pivotally mounted in the upper side of a conventional type fishing net such as used in trolling operations to catch shrimp and the like. The hinge for the panel is located in the leading direction of movement of the net so tat during a trolling operation, the force of the water will keep the panel closed. When the trolling operation ceases, the panel will tend to lower to an open position due to gravity thereby allowing the more active species of fish, crabs and the like, to escape out through the opening. The remaining catch will be the desired shrimp. While the escape hatch which is used in conjunction with a conventional fish net, has a plurality of rigid openings, the size of the openings is substantially smaller than the mesh openings of the net and there is no discussion of sorting fish by size.

The patent to West et al. (U.S. Pat. No. 4,805,335) is directed to a sorting device for troll nets. The sorting device enables capturing of preselected marine life and harmlessly separating non-selected marine life. However, the sorting device is comprised of a substantially funnel-shaped outlet located in the side of the troll net to allow the escape of undesirable species. There is no discussion or suggestion of sorting a particular species by size.

SUMMARY OF THE INVENTION

The present invention provides a new and improved fish net having an escape panel incorporated therein to allow undersized fish of a particular species to pass through the net while retaining the desired size fish of that species.

The present invention provides a new and improved fish net having an escape panel wherein the fish net is constructed of conventional, flexible, open mesh net material and the escape panel is comprised of a substantially rigid panel secured in an aperture in the net and having a plurality of substantially rectilinear apertures therein dimensioned to permit undersized fish of a particular species to pass therethrough.

The foregoing and other objects, features and advantages of the invention will be apparent from the following more particular description of a preferred embodiment of the invention as illustrated in the accompanying drawings.

DETAILED DESCRIPTION OF THE INVENTION

Figure 1:
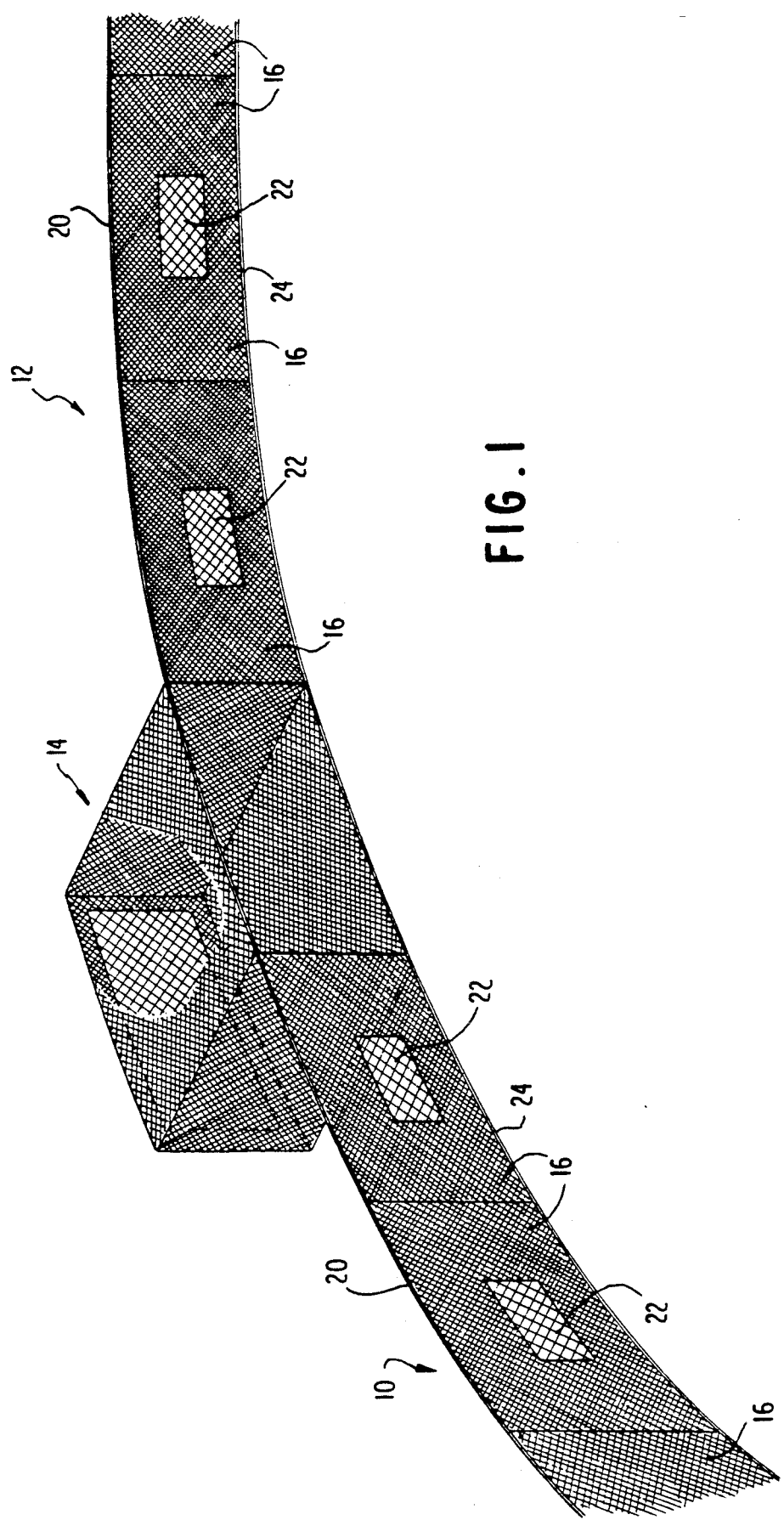
FIG. 1 is a schematic perspective view of a haul seine net having escape panels therein.

The haul seine net shown in the embodiment of FIG. 1 is comprised of two elongated wing sections 10 and 12 connected on opposite sides to a substantially central pocket section 14. Each wing section 10 and 12 is comprised of a plurality of substantially identical rectangular panels 16 with each section being approximately 300 feet in length. The sections are connected to each other by sewing the net panels together or connecting them by any other suitable, well-known means. A float line 20 extends along the top of each wing and is connected to each section. A plurality of floats (not shown) of any suitable type may be secured at spaced intervals along each float line. The height of each section is sufficient so that it reaches from the bottom to the top of the water in which the net is to be worked.

Each section is provided with a rectangular escape panel 22 secured in an aperture in the net of each section by any suitable means. Each escape panel is constructed of high density extruded polyethylene netting which is fairly rigid so that the mesh openings of the panel will retain their substantially rectilinear configuration at all times. However, each escape panel may have some degree of flexibility which will allow the entire panel to bend slightly to conform to the shape of the net. The rigidity of each mesh opening is essential to the operation of the panel as it allows undersized fish to pass through the panel without becoming "gilled" in the panel as they would in a gillnet. The size of each escape panel may vary depending upon the circumstances and the size of the mesh openings of each panel may vary depending upon the species of fish involved. For example, when fishing for gray trout, each panel is provided with a 2½ inch square mesh with the sides of the mesh located substantially at an angled 45% relative to horizontal and vertical planes during a fishing operation. A flounder escape panel may have a flattened rectangular configuration wherein the horizontal dimension of each mesh is greater than the vertical dimension of each mesh. A lead line 24 extends along and is secured to the bottom of each wing. Secured between the two end adjacent sections of each wing is the pocket 14 which has an opening of approximately 20'×20' and which extends back approximately 20'. The back wall of the panel can be constructed substantially entirely of escape panel material of the type described for the panels 22.

In use, the haul seine net is pulled through the water to encircle a school of fish with the net being deep enough so that it reaches from the top to the bottom of the water in which it is worked. When the school of fish has been encircled, the seine is pulled up on a beach to land the catch. As the haul seine is pulled closer to shore and the half circle is closed, the fish are funneled into the pocket in the back of the seine. This is where the fish are concentrated prior to landing and is the most important location in which to install the escape panels. The escape panels in the wings of the net also let the fish escape as the net is being closed. In some states, one end of the seine net must remain stationary until the net is closed in a circle at the end of the haul while in other states, both ends of the seine net may be towed.

Figure 2:
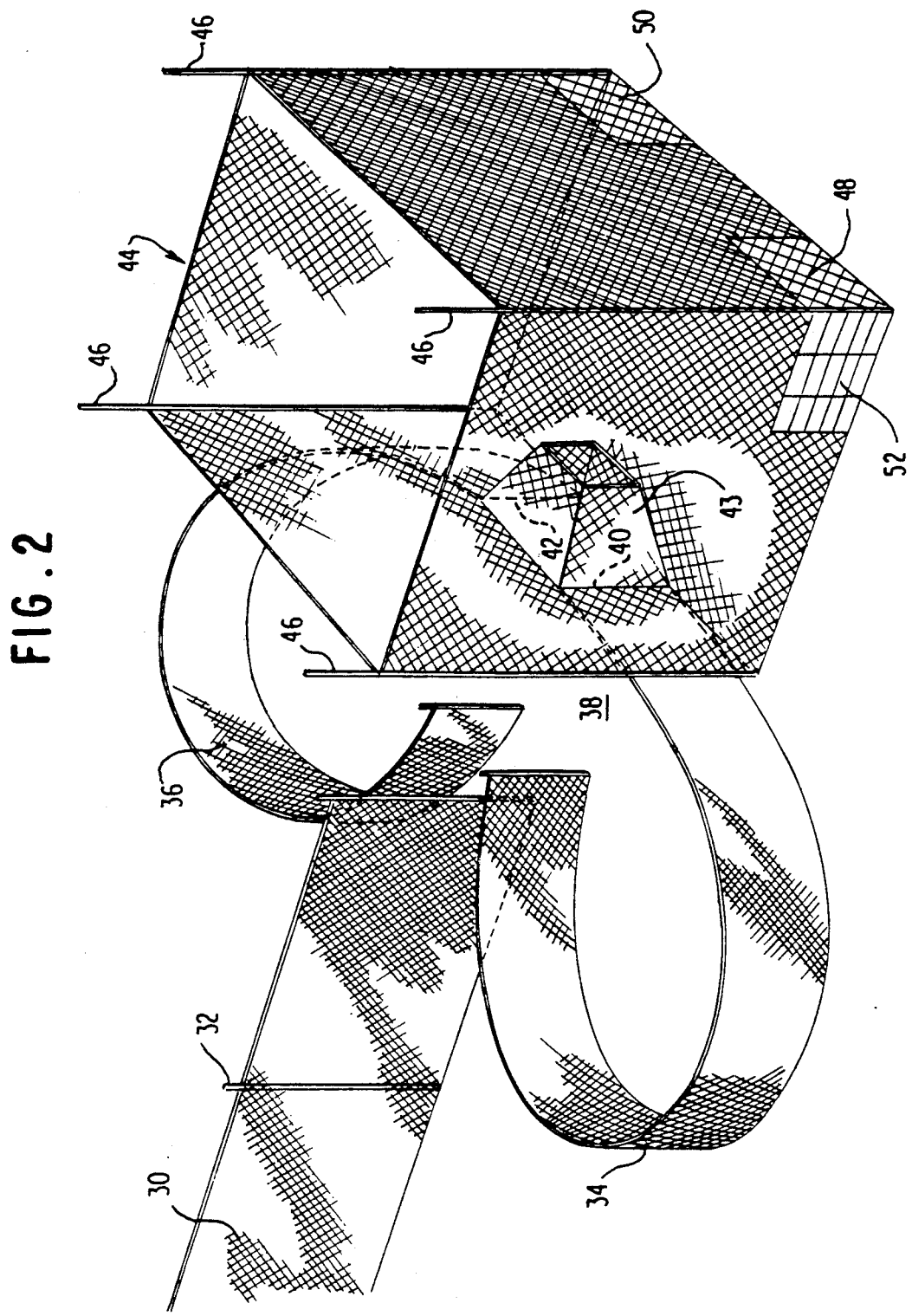
FIG. 2 is a schematic perspective view of a pound net having escape panels therein.

The pound net embodiment shown in FIG. 2 can also utilize the escape panels of the present invention. In a pound net arrangement, a leader section 30 is comprised of a length of fish netting disposed in a substantially vertical position by means of spaced apart stakes 32 to which the netting is secured. Two heart-shaped sections of net 34 and 36 are staked in a similar manner on opposite sides of the leader 30 With the adjacent ends of the heart-shaped sections being spaced apart from each other and the leader to allow fish to enter the enclosure 38 defined by the heart-shaped sections. The opposite ends of the heart-shaped sections 40 and 42 are secured to opposite sides of an opening in a pound head 44. A funnel 43 or net or other material is secured in the opening to help retain the fish in the pound net. The pound head 44 is comprised of a five sided net structure supported at the four corners by poles 46 with the top open. A pair of escape panels 48 and 50 are secured in the net adjacent the outside bottom corner of the pound head on the off shore side thereof. The escape panels 48 and 50, as shown, are suitable for trout, as described above. A typical flounder panel 52 is shown secured to a side wall of the net adjacent the escape panel 48. If desired, a funnel could be secured about the periphery of the panel 50, which would be connected to a haul seine pocket or a small pound head for collecting the fish escaping from the main pound head 44. Alternatively, a Fyke net anchored away from the pound net could be used. The sole purpose of collecting the undersized fish escaping from the pound head 44 would be to quantify savings attributable to the use of the escape panels. The funnel could be constructed with hoops like a Fyke net. The use of a pound net having an escape panel with a diamond shaped mesh 2½ inches square was found to allow all weak fish (grey trout) under 10 inches to escape.

While various dimensions have been mentioned in the foregoing description of the two embodiments, it is obvious that the dimensions can be readily varied depending upon the type of fish net involved and the species of fish which are being sought. While the use of the escape panel has been shown with respect to a haul seine net and a pound head net, it is obvious that the panels could be used with other types of fish net. In general, the fish net would have a standard mesh opening substantially less than the mesh of the escape panels to prevent the gilling of the fish on the net while permitting the undersized fish to escape through the mesh of the escape panel.

While the invention has been particularly shown and described with reference to preferred embodiments thereof, it will be understood by those in the art that the foregoing and other changes in form and details may be made therein without departing from the spirit and scope of the invention.

What is claimed is:

1. A fish net having an escape hatch comprising a flexible fish net having an open mesh construction for collecting and retaining fish, said net having at least one aperture therein and an escape panel comprised of substantially rigid extruded high density polyethylene open mesh material secured to said net in said aperture whereby mesh openings in said panel will retain their dimensions while permitting flexing of said panel.

* * * * *